(12) United States Patent
Uemura

(10) Patent No.: US 8,085,483 B2
(45) Date of Patent: Dec. 27, 2011

(54) LENS BARREL

(75) Inventor: Kouhei Uemura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/693,211

(22) Filed: Jan. 25, 2010

(65) Prior Publication Data
US 2010/0195224 A1    Aug. 5, 2010

(30) Foreign Application Priority Data

Feb. 4, 2009 (JP) ................................. 2009-023735

(51) Int. Cl.
G02B 7/02 (2006.01)
(52) U.S. Cl. ......................... 359/826; 359/811; 359/819
(58) Field of Classification Search ........... 359/811–830
See application file for complete search history.

(56) References Cited

U.S. PATENT DOCUMENTS

| 7,433,137 B2 * | 10/2008 | Irisawa ........................ 359/819 |
| 2007/0033857 A1 | 2/2007 | Myers |
| 2008/0180812 A1 | 7/2008 | Honsho et al. |

FOREIGN PATENT DOCUMENTS

| JP | 2006-243569 | 9/2006 |
| JP | 2008-185786 | 8/2008 |

OTHER PUBLICATIONS

The above reference was cited in a Apr. 25, 2011 Chinese Office Action, which is enclosed with English Translation, that issued in Chinese Patent Application No. 201010102624.6.

* cited by examiner

*Primary Examiner* — Mohammed Hasan
(74) *Attorney, Agent, or Firm* — Cowan, Liebowitz & Latman, P.C.

(57) ABSTRACT

A telescopic lens barrel which is capable of increasing the assembling workability and advancing and retracting a lens in an optical axis direction of the lens barrel with high accuracy, without miniaturizing of the lens barrel. A barrel base plate holds an image pickup device. A fixed cylinder is secured to the barrel base plate and has an axis in an optical axis direction of the lens barrel. A guide shaft holds a lens frame so as to be advanced and retracted in the optical axis direction in the fixed cylinder and held by the barrel base plate. The barrel base plate includes bearing portions holding the guide shaft on opposite sides of a sliding region of the lens frame, and a protruding portion of the guide shaft protruding from one of the bearing portions of the barrel base plate is regulated in position by the fixed cylinder.

6 Claims, 5 Drawing Sheets

LENS BARREL

BACKGROUND OF THE INVENTION

1. Field of the Invention

The present invention relates to a lens barrel, and more particularly to a telescopic lens barrel that holds a lens so as to be advanced and retracted in an optical axis direction of the lens barrel.

2. Description of the Related Art

In recent years, image pickup apparatuses such as digital still cameras or digital video cameras have been required to have higher portability or usability, and the entire apparatus has been reduced in size.

Also, the size of a lens barrel of a telescopic type or the like used in the image pickup apparatus has been reduced in size. In this case, there is a strong desire for higher image quality and higher pixelation, and it is desired to reduce the size of the lens barrel of the telescopic type or the like without reducing the size of a lens as an optical component. The telescopic lens barrel is disclosed in Japanese Laid-Open Patent Publication (Kokai) No. 2008-185786 and Japanese Laid-Open Patent Publication (Kokai) No. 2006-243569.

An increasing number of the telescopic lens barrels have been reported including a guide shaft that is placed outside a fixed cylinder for guiding a lens so as to be advanced and retracted in an optical axis direction of the lens barrel, for reduction in size. In this case, the guide shaft is required to be positioned with high accuracy and secured in order to advance and retract the lens in the optical axis direction with high accuracy.

However, in a first conventional lens barrel in Japanese Laid-Open Patent Publication (Kokai) No. 2008-185786, a barrel base plate and a fixed cylinder hold a guide shaft therebetween, and thus bearings of the guide shaft are disposed in two components. This reduces the positioning accuracy of the guide shaft, and makes it difficult to advance and retract the lens in the optical axis direction with high accuracy. In the first lens barrel, the guide shaft is not held until the fixed cylinder is incorporated into the barrel base plate, thereby reducing the assembling workability.

Also, in a second conventional lens barrel in Japanese Laid-Open Patent Publication (Kokai) No. 2006-243569, only a barrel base plate holds a guide shaft. However, in the second conventional lens barrel, the guide shaft is placed outside a fixed cylinder, which reduces the strength of a bearing portion of the barrel base plate. This reduces the positioning accuracy of the guide shaft, and makes it difficult to advance and retract the lens in the optical axis direction with high accuracy.

SUMMARY OF THE INVENTION

The present invention provides a telescopic lens barrel which is capable of increasing the assembling workability and advancing and retracting a lens in an optical axis direction of the lens barrel with high accuracy, without miniaturization of the lens barrel.

In an aspect of the present invention, there is provided a lens barrel comprising a barrel base plate adapted to hold an image pickup device; a fixed cylinder secured to the barrel base plate and having an axis in an optical axis direction of the lens barrel; and a guide shaft adapted to hold a lens frame so as to be advanced and retracted in the optical axis direction in the fixed cylinder and held by the barrel base plate, wherein the barrel base plate includes bearing portions adapted to hold the guide shaft on opposite sides of a sliding region of the lens frame, and a protruding portion of the guide shaft protruding from one of the bearing portions of the barrel base plate is regulated in position by the fixed cylinder.

According to the present invention, it is possible to provide a telescopic lens barrel which is capable of increasing the assembling workability and advancing and retracting a lens in the optical axis direction of the lens barrel with high accuracy.

Further features and advantages of the present invention will become apparent from the following detailed description of exemplary embodiments with reference to the attached drawings.

DETAILED DESCRIPTION OF THE EMBODIMENTS

The present invention will now be described in detail with reference to the drawings.

Figure 1:
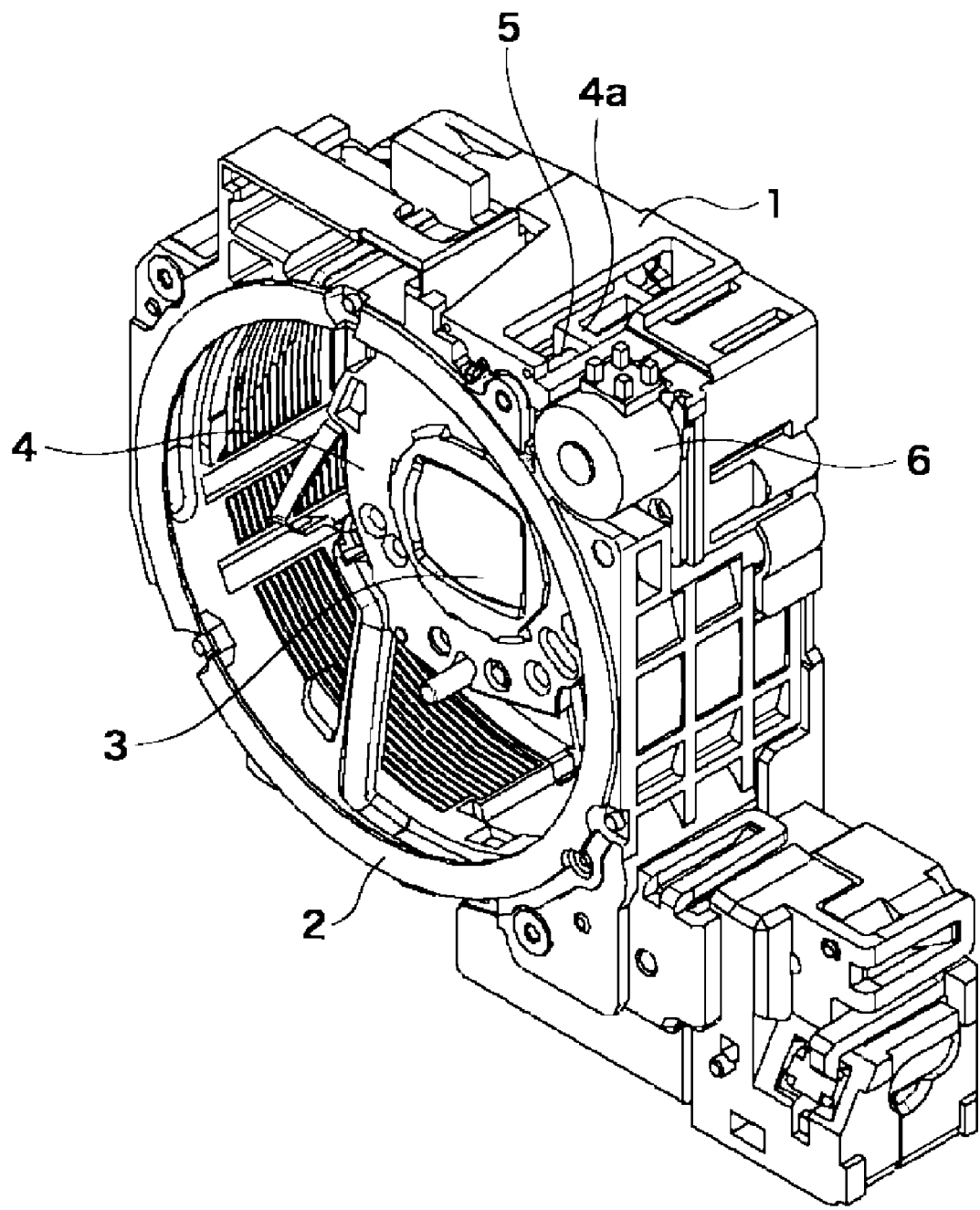
FIG. 1 is a partial perspective view of a telescopic lens barrel according to a first embodiment of the present invention.
Figure 2:
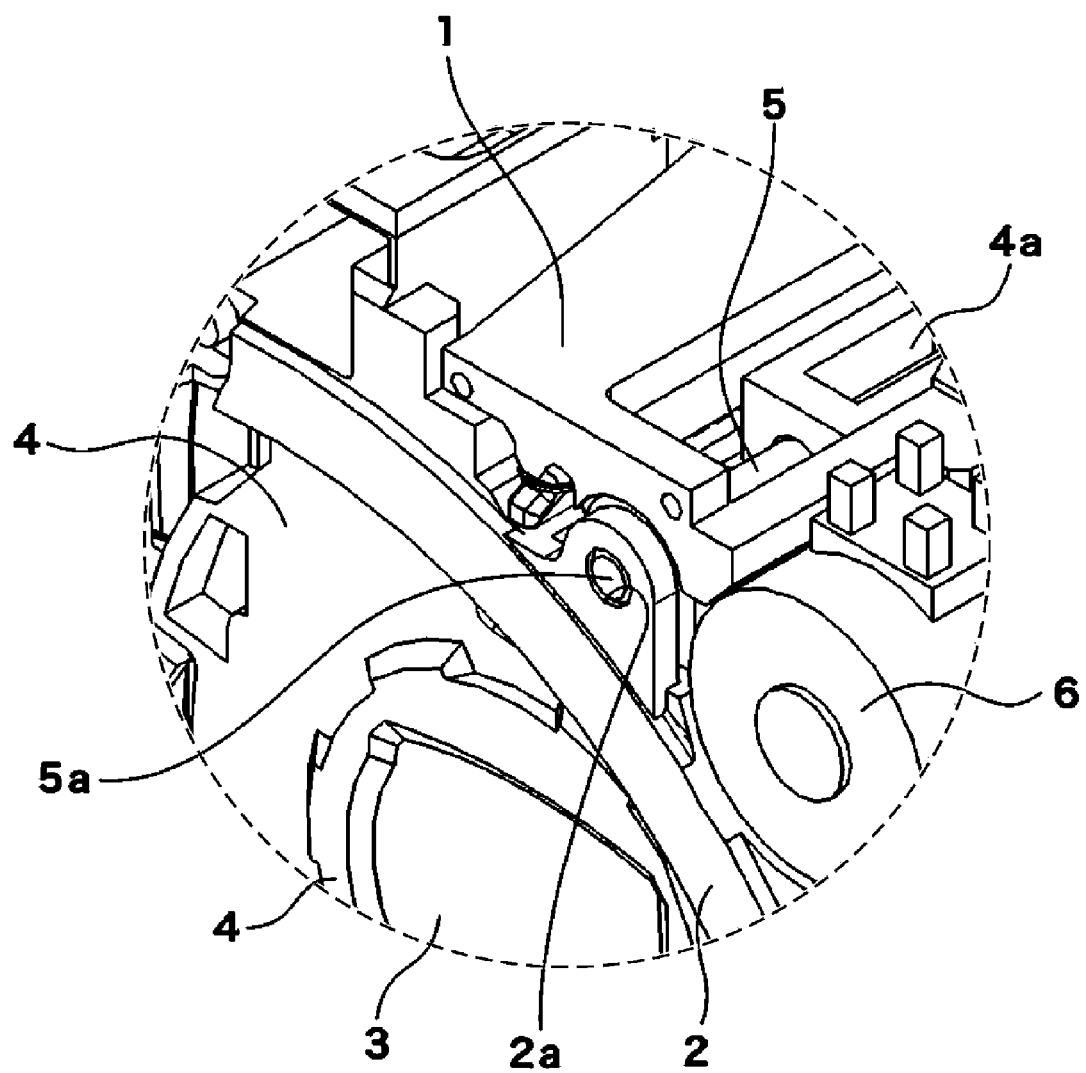
FIG. 2 is a partial enlarged view of the lens barrel of FIG. 1.
Figure 3:
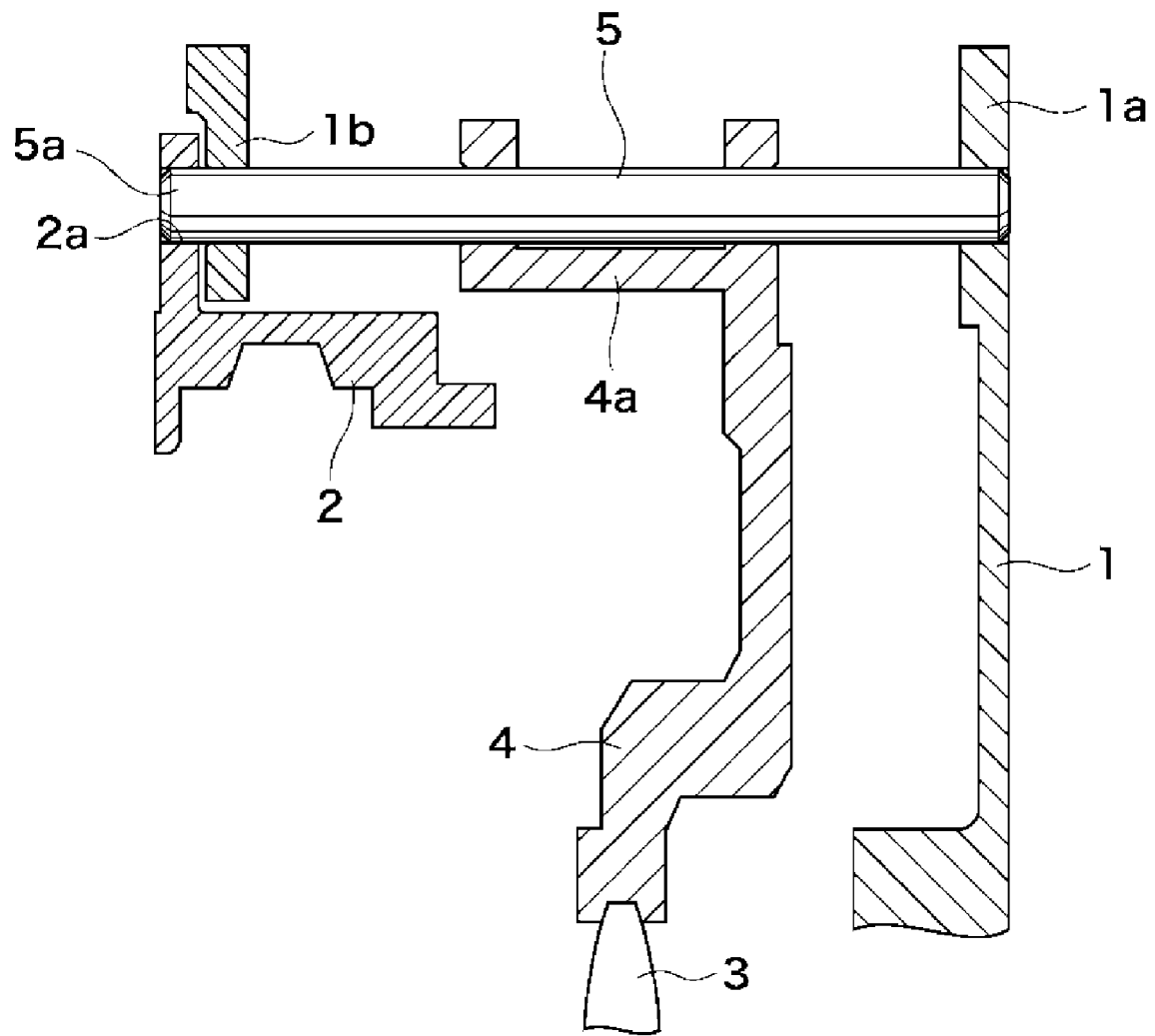
FIG. 3 is a sectional view showing a holding state of a guide shaft of the lens barrel of FIG. 1.
Figure 4:
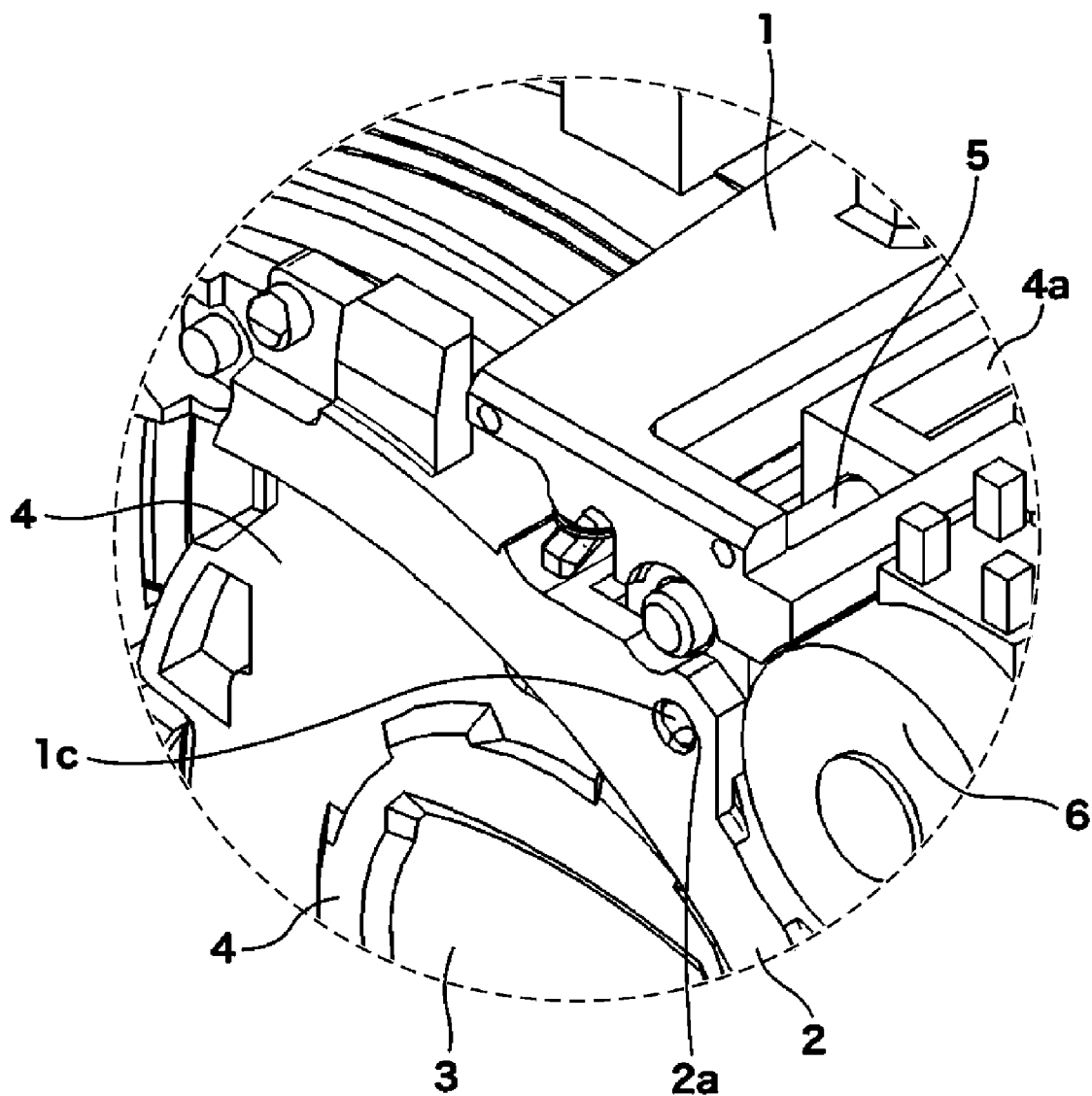
FIG. 4 is a partial perspective view of the vicinity of a guide shaft of a telescopic lens barrel according to a second embodiment of the present invention.
Figure 5:
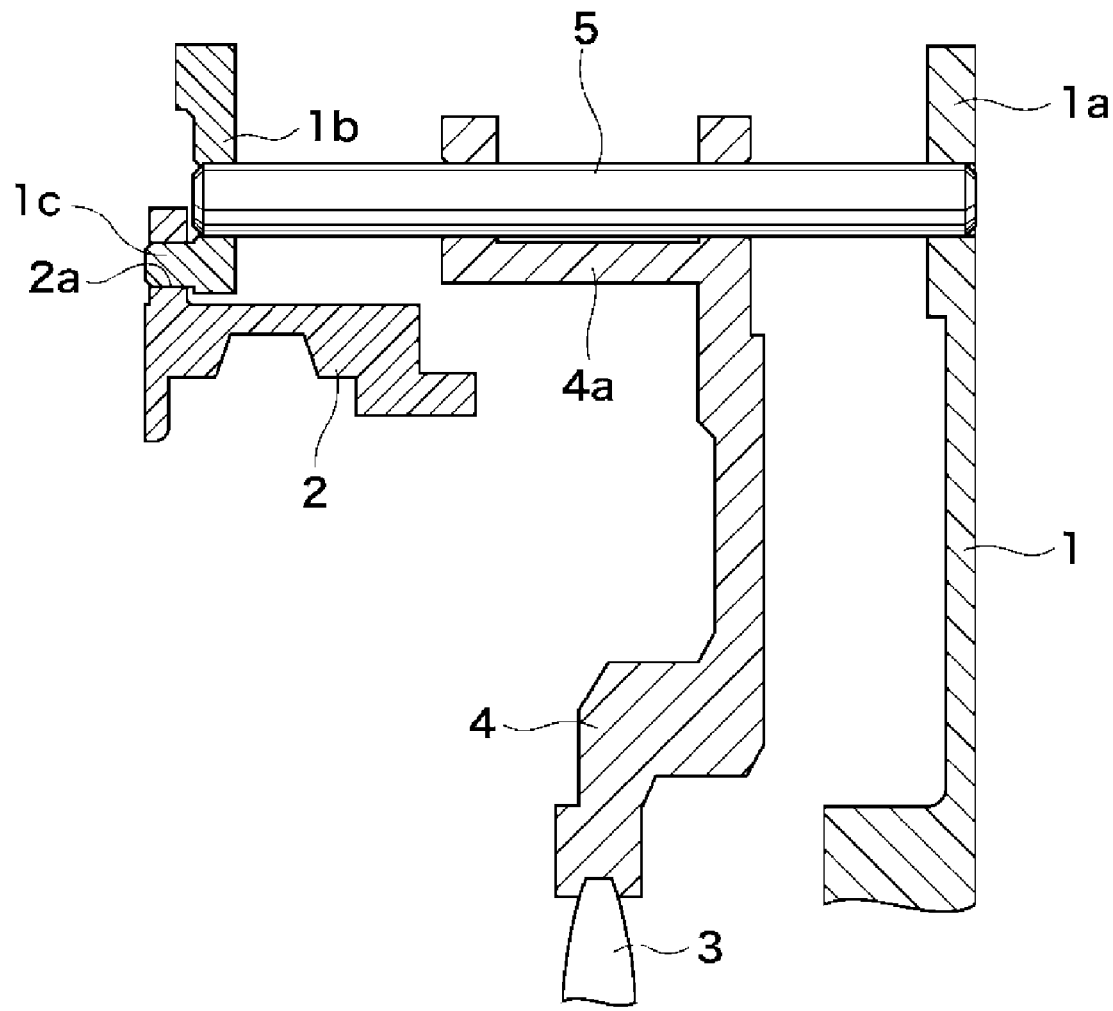
FIG. 5 is a sectional view of the vicinity of the guide shaft of FIG. 4.

FIG. 1 is a partial perspective view of a telescopic lens barrel according to a first embodiment of the present invention. FIG. 2 is a partial enlarged view of the lens barrel of FIG. 1. FIG. 3 is a sectional view showing a holding state of a guide shaft of the lens barrel of FIG. 1. It should be noted that the lens barrel shown in FIGS. 1 to 3 is assumed to be disposed in a still camera (The same is true of FIGS. 4 and 5 showing a second embodiment of the present invention described later).

In FIGS. 1 to 3, reference numeral 1 denotes a barrel base plate holding an image pickup device (not shown), 2; a fixed cylinder secured to the barrel base plate 1 and having an axis in an optical axis direction of the lens barrel, 3; a focus lens advanced and retracted in the optical axis direction, and 4; a lens frame holding the focus lens 3. Reference numeral 5 denotes a guide shaft that holds the lens frame 4 so as to be advanced and retracted in the optical axis direction, which is placed outside the fixed cylinder 2 with respect to the optical axis, more strictly, outside a body (cylinder portion) of the fixed cylinder 2. Reference numeral 6 denotes a focus motor unit that advances and retracts the lens frame 4 in the optical axis direction.

As described above, since the guide shaft 5 is placed outside the fixed cylinder 2, other components can be disposed in a space for a guide shaft 5 and a sliding portion 4a of the lens frame 4 required in a case where the guide shaft 5 is conventionally placed inside the fixed cylinder 2, thereby reducing in size the lens barrel.

As shown in FIG. 3, the guide shaft 5 is held by one bearing portion 1a and the other bearing portion 1b of the barrel base plate 1 on opposite sides of a sliding region of the sliding portion 4a of the lens frame 4. In other words, the guide shaft 5 is held by a single component as the barrel base plate 1.

Thus, the guide shaft 5 can be positioned only by the barrel base plate 1 and can be positioned with higher accuracy, and also the assembling workability of the lens barrel is increased as described later.

It should be noted that, in FIG. 3, the image pickup device (not shown) is held by the barrel base plate 1 at a right end of the one bearing portion 1a, and the other bearing portion 1b is located away from the image pickup device with respect to the one bearing portion 1a.

The sliding portion 4a of the lens frame 4 is fitted to the guide shaft 5 held by the barrel base plate 1. Thus, the lens frame 4, that is, the focus lens 3 is held by the barrel base plate 1 so as to be advanced and retracted in the optical axis direction.

In this case, a focus motor unit 6 is used as a drive source for the lens frame 4. Specifically, the focus motor unit 6 is secured to the barrel base plate 1 by a screw or an adhesive, transmits a drive force thereof to the lens frame 4 via a feed screw mechanism (not shown), and thus advances and retracts the lens frame 4 in the optical axis direction. A nut that constitutes the feed screw mechanism may be held either by the lens frame 4 or by the focus motor unit 6.

With the lens frame 4, the guide shaft 5, and the focus motor unit 6 integrated into the barrel base plate 1, a mechanism that advances and retracts the focus lens 3 in the optical axis direction is completed, thereby increasing the assembling workability and also allowing the operation confirmation to be performed in this stage.

Then, the fixed cylinder 2 into which other lens group or lens drive mechanism is incorporated is secured by a screw or an adhesive to the barrel base plate 1 into which the focus mechanism is incorporated.

In this case, as shown in FIG. 3, the guide shaft 5 is held so as to pass through the other bearing portion 1b of the barrel base plate 1, that is, the other bearing portion 1b located away from the image pickup device, and has a guide shaft protruding portion 5a protruding from the other bearing portion 1b. The guide shaft protruding portion 5a fits in a position regulating hole 2a in the fixed cylinder 2 to regulate a position of the guide shaft 5.

This controls the deformation of the bearing portion (particularly, the other bearing portion 1b) of the barrel base plate 1, and reduces the inclination of the guide shaft 5 with respect to the image pickup device to increase the positional accuracy of the guide shaft 5. This reduces the inclination of the focus lens 3 with respect to a plane perpendicular to the optical axis direction, thereby allowing the focus lens 3 to be advanced and retracted in the optical axis direction with high accuracy.

In the above first embodiment, the protruding portion 5a of the guide shaft 5 is protruded from the bearing portion 1b of the barrel base plate 1 to fit into the position regulating hole 2a of the fixed cylinder 2, thereby controlling the deformation of the bearing portion 1b of the barrel base plate 1 and reducing the inclination or the like of the guide shaft 5.

On the contrary, a second embodiment of the present invention aims to control the deformation of a bearing portion 1b of a barrel base plate 1 and reduce the inclination or the like of a guide shaft 5 without protruding a guide shaft 5 from the bearing portion 1b of the barrel base plate 1

Specifically, in the second embodiment, as shown in FIGS. 4 and 5, a position regulating shaft 1c for regulating a position of the barrel base plate 1 is formed in the bearing portion 1b of the barrel base plate 1. The position regulating shaft 1c is directly fitted into a position regulating hole 2a in the fixed cylinder 2.

The position regulating hole 2a in the first embodiment and the position regulating hole 2a in the second embodiment are deemed to be different in forming position from each other, but they are herein denoted by the same reference numeral for convenience.

Also according to the second embodiment, it is possible to control the deformation of the bearing portion 1b (particularly, the bearing portion 1b) of the barrel base plate 1 and reduce the inclination of the guide shaft 5 with respect to the image pickup device to thereby increase the positional accuracy of the guide shaft 5, as is the case with the first embodiment. This reduces the inclination of the focus lens 3 with respect to a plane perpendicular to the optical axis direction, thereby allowing the focus lens 3 to be advanced and retracted in the optical axis direction with high accuracy.

Also in the second embodiment, the guide shaft 5 is held only by the barrel base plate 1 as a single component and placed outside the fixed cylinder 2, thereby providing a lens barrel which is excellent in the assembling workability and the miniaturization.

The present invention is not limited to the first and the second embodiment, but these embodiments may be combined, for example.

Specifically, the protruding portion 5a of the guide shaft 5 is protruded from the bearing portion 1b of the barrel base plate 1 to fit into the position regulating hole 2a in the fixed cylinder 2, and the position regulating shaft 1c formed in the bearing portion 1b of the barrel base plate 1 is directly fitted into another position regulating hole separately formed in the fixed cylinder 2.

Also, the lens barrel according to the first and the second embodiment can be applied not only to still cameras but also to image pickup apparatuses such as other digital cameras or digital video cameras.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2009-023735, filed Feb. 4, 2009, which is hereby incorporated by reference herein in its entirety.

What is claimed is:

1. A lens barrel comprising:
a barrel base plate adapted to hold an image pickup device;
a fixed cylinder secured to said barrel base plate and having an axis in an optical axis direction of the lens barrel; and
a guide shaft adapted to hold a lens frame so as to be advanced and retracted in the optical axis direction in said fixed cylinder,
wherein said guide shaft is held by said barrel base plate with at least two bearing portions, and a protruding portion of said guide shaft protruding from one of the bearing portions of said barrel base plate is regulated in position by said fixed cylinder.

2. The lens barrel according to claim 1, wherein said guide shaft is placed outside said fixed cylinder with respect to the axis of said fixed cylinder.

3. The lens barrel according to claim 1, wherein one of the bearing portions of said barrel base plate is located away from the other of the bearing portions of said barrel base plate.

4. A lens barrel comprising:
a barrel base plate adapted to hold an image pickup device;
a fixed cylinder secured to said barrel base plate and having an axis in an optical axis direction of the lens barrel; and
a guide shaft adapted to hold a lens frame so as to be advanced and retracted in the optical axis direction in said fixed cylinder, wherein said guide shaft is held by said barrel base plate, with at least two bearing portions, and one of the bearing portions of said barrel base plate is regulated in position by said fixed cylinder.

5. The lens barrel according to claim 4, wherein said guide shaft is placed outside said fixed cylinder with respect to the axis of said fixed cylinder.

6. The lens barrel according to claim 4, wherein one of the bearing portions of said barrel base plate is located away from the other of the bearing portions of said barrel base plate.

* * * * *